United States Patent
Bloom et al.

(10) Patent No.: US 7,116,911 B2
(45) Date of Patent: Oct. 3, 2006

(54) OPTICAL TRANSCEIVER DESIGN AND MECHANICAL FEATURES

(75) Inventors: Scott Harris Bloom, Encinitas, CA (US); Oskar Hammer Kirsten, San Diego, CA (US); James J. Alwan, Ramona, CA (US)

(73) Assignee: Kiribati Wireless Ventures, LLC, Las Vegas, NV (US)

( * ) Notice: Subject to any disclaimer, the term of this patent is extended or adjusted under 35 U.S.C. 154(b) by 769 days.

(21) Appl. No.: 09/859,563

(22) Filed: May 16, 2001

(65) Prior Publication Data
US 2002/0005972 A1    Jan. 17, 2002

Related U.S. Application Data

(60) Provisional application No. 60/242,220, filed on Oct. 20, 2000, provisional application No. 60/212,038, filed on Jun. 16, 2000, provisional application No. 60/204,361, filed on May 16, 2000.

(51) Int. Cl.
*H04B 10/00* (2006.01)

(52) U.S. Cl. ............ 398/131; 398/121; 398/122; 398/129

(58) Field of Classification Search ........ 398/117, 398/121, 122, 129, 130, 131, 135, 138
See application file for complete search history.

(56) References Cited

U.S. PATENT DOCUMENTS

| | | | |
|---|---|---|---|
| 4,626,850 A * | 12/1986 | Chey | 340/903 |
| 4,764,983 A * | 8/1988 | Walter | 398/131 |
| 5,390,040 A * | 2/1995 | Mayeux | 398/129 |
| 5,405,347 A * | 4/1995 | Lee et al. | 606/54 |
| 5,546,445 A | 8/1996 | Dennison et al. | 379/60 |
| 5,786,923 A | 7/1998 | Doucet et al. | 359/172 |
| 5,926,151 A * | 7/1999 | Hagiwara et al. | 343/882 |
| 5,977,908 A * | 11/1999 | Nichols | 342/357.08 |
| 6,016,313 A | 1/2000 | Foster, Jr. et al. | 370/330 |
| 6,049,593 A | 4/2000 | Acampora | 379/56.2 |
| 6,297,897 B1 * | 10/2001 | Czichy et al. | 398/122 |
| 6,590,685 B1 * | 7/2003 | Mendenhall et al. | 398/121 |
| 6,934,629 B1 * | 8/2005 | Chisholm et al. | 701/213 |

FOREIGN PATENT DOCUMENTS

WO    WO 0025454    5/2000

OTHER PUBLICATIONS

Bloom S. et al., Status of BMDO/IST Lasercom Advanced Technology Demonstration, SPIE vol. 2123 pp. 96-107.
Busch T. et al., Overview of Laser Communication Technologies at Rome Laboratory, SPIE vol. 2123 pp. 24-33.

* cited by examiner

*Primary Examiner*—M. R. Sedighian

(57) ABSTRACT

A node for use in a wireless communication network that facilitates alignment of the node with other nodes in the network and a method for aligning the node. The node includes mounting fixtures that enables the mounting of GPS receivers and a tiltmeter to obtain position and bearing information for the node. The node contains alignment features that enable the positioning of an optical transmitter/receiver pair in the node using the data obtained from the GPS receivers and tiltmeter.

40 Claims, 12 Drawing Sheets

OPTICAL TRANSCEIVER DESIGN AND MECHANICAL FEATURES

The benefit under 35 U.S.C. § 119(e) of the following U.S. provisional applications entitled FREE SPACE ALIGNMENT BY GPS, Ser. No. 60/204,361, filed May 16, 2000, METHOD AND SYSTEM FOR ENCLOSING AN OPTICAL COMMUNICATIONS TERMINAL, Ser. No. 60/212,038, filed Jun. 16, 2000, and OPTICAL TRANSCEIVER DESIGN AND MECHANICAL FEATURES, Ser. No. 60/242,220, filed Oct. 20, 2000, is hereby claimed and which are hereby incorporated by reference.

BACKGROUND OF THE INVENTION

1. Field of the Invention

This invention relates to free-space optical communication systems, and in particular, to improved mechanical features that enable alignment of the optical transceiver nodes.

2. Description of the Related Art

Over the last several years there has been tremendous growth in the deployment of fiber-optic facilities by telecommunications carriers such as Regional Bell Operating Companies (RBOCs), cable carriers, and Competitive Local Exchange Carriers (CLECs). Deployment of these facilities along with the introduction of technologies such as OC-192 and DWDM has dramatically lowered the marginal cost of bandwidth on the fiber.

Thus, as a result of this development, there is extensive bandwidth and communications capability in carriers' backbone networks. However, many homes and offices do not have a practical solution to interface to these backbone networks. Consequently, direct attachment of potential customers to these backbone networks remains very expensive.

Currently, there are two practical methods for directly attaching customers to backbone networks such as optical fiber networks. These are buried or aerial fiber interconnections and microwave connections. However, both of these methods incur significant up-front costs before any revenue can be realized. In the case of buried or aerial fiber, these costs are associated with obtaining rights-of-way for the cable runs, and installing the cable by burying or hanging. In the case of a microwave system, these up front costs come not only from the cost associated with the microwave repeater equipment, but also from the costs associated with obtaining rights to the suitable portion of the spectrum. Therefore, system developers and integrators have sought long and hard to find suitable solutions to this "last mile" problem.

Free-space optical communication systems provide a solution to this "last mile" problem. Free-space systems may be designed to use one or more optical beams, usually generated by lasers, to carry and transmit data over the free space between two communication terminals or nodes. The transmitting communication node includes one or more lasers to generate an information-bearing optical beam. The corresponding receiving terminal or node, which has an optical detector and associated signal processing circuit, converts the information into an electrical signal for further routing or processing. A communication node may include at least one laser and one detector to operate as an optical transceiver.

It is desirable to facilitate the initial alignment of the transmitting node and the receiving node. Additionally, after initial installation has been completed, it may become necessary to quickly replace a damaged or dysfunctional node with a replacement node. It is further desirable to facilitate reestablishing the communication link by enabling the replacement node to be pre-aligned so that it can simply be directed to point to the same location as the transceiver in the node that has been replaced.

SUMMARY OF THE INVENTION

One embodiment of the invention is directed to a node for use in a wireless communication network. The node includes a base mount device configured to removably receive a position determination device and a tiltmeter, an azimuth plate, an optical receiver/transmitter pair mounted on the azimuth plate and a post. The azimuth plate is rotatably mounted on the post and the post is configured to align the azimuth plate with the base mount.

Another embodiment of the invention is directed towards a system for positioning and aligning a receiver/transmitter pair of a communication node that is part of a wireless communication network. The system includes at least one position determination device configured to determine the position of the positioning system, a tiltmeter, configured to determine the orientation of the positioning system within the network, and a node. The node includes a base mount configured to removably receive a position determination device and a tiltmeter, an azimuth plate, an receiver/transmitter pair mounted on the azimuth plate and a post. The azimuth plate is rotatably mounted on the post ant the post is configured to align the azimuth plate with the mounting interface device.

Another embodiment of the invention is directed towards a method of directing a directional transmitter/receiver pair of a node in a wireless communications network. The method includes the steps of assembling a node, wherein the node includes a mounting interface device configured to removably receive a position determination device and a tiltmeter, an azimuth plate, a directional receiver/transmitter pair mounted on the azimuth plate and a post, wherein the azimuth plate is rotatably mounted on the post ant the post is configured to align the azimuth plate with the mounting interface device. The method can include determining tolerance offset data for the node, storing the offset data in a memory, installing the node on a fixture at the host site. The position and bearing of the node are determined using a position determination device installed on the node, and the pitch and roll of the node are determined using a tiltmeter installed on the node. The optical transmitter/receiver pair is pointed to the transceivers of another node using the offset data stored in the memory, the position, bearing, pitch and roll data.

BRIEF DESCRIPTION OF THE DRAWINGS

These and other objects and features of the present invention will become more fully apparent from the following description and appended claims taken in conjunction with the following drawings, where like reference numbers indicate identical or functionally similar elements. Additionally, the left-most digit(s) of a reference number identifies the drawing in which the reference number first appears.

FIG. 10a is a top elevation view of the turret of FIG. 9a.

FIG. 10b is a bottom elevation view of the turret of FIG. 9a.

DETAILED DESCRIPTION OF THE PREFERRED EMBODIMENT

The following presents a detailed description of embodiments of the present invention. However, the invention can be embodied in a multitude of different ways as defined and covered by the claims.

Figure 1:
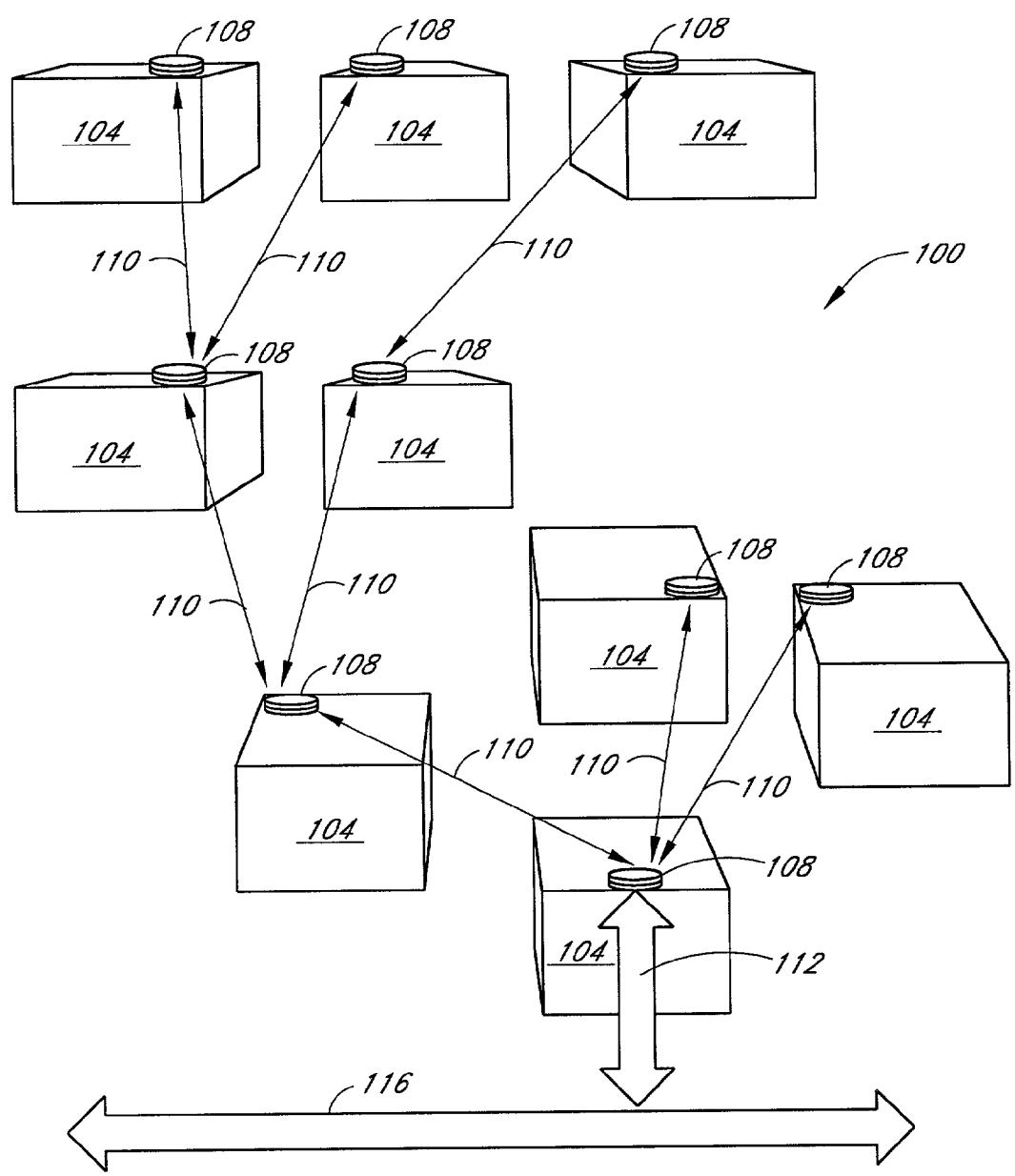
FIG. 1 is a diagram illustrating an example communication network according to one embodiment of the invention.

FIG. 1 is a diagram illustrating an example communication network 100. The communication network 100 can include a plurality of nodes 108, interconnected by communication links 110. The network nodes 108 are disposed on facilities 104. Although only one node 108 is provided per facility in the example illustrated in FIG. 1, more than one node 108 can be provided at one or more of the facilities 104, depending on the communication requirements, and also, perhaps, depending on the particular facility.

Facilities 104 can be buildings, towers, or other structures, premises, or locations. Facilities 104 can, for example, be homes or offices to which it is desirable to interface one or more backbone networks of one or more common carriers or service providers. In this example embodiment, network 100 can provide the interface between the facilities and the backbone network.

Nodes 108 are interconnected with one another by optical communication links 110. In this optical embodiment, nodes 108 can include one or more optical transmitters and receivers to provide the communication links 110 among the plurality of nodes 108. Additionally, the nodes can be interconnected with radio frequency communication links. The number of transmitters and receivers provided at a given node 108 can be varied depending on the fan-out capabilities desired at that node 108. The provision of both a receiver and a transmitter (i.e., transceiver) for each fan out of the node 108 allows bidirectional communication among nodes 108.

In one embodiment, each node 108 includes pointing mechanisms such that the transmitters and receivers can be rotated to point to a designated other node 108 as will be discussed below. In one embodiment, such pointing can be performed in both azimuth and elevation. Ideally, each transmitter and receiver can be independently pointed to a designated node 108.

The network 100 can be implemented and utilized to directly connect a plurality of customers in one or more facilities 104 to a high-capacity communication network 116. For example, network 100 can be used to connect the plurality of customers to a copper or optical fiber backbone network. The network 100 can therefore allow the customers to access a high data rate, high-bandwidth communication network from their home, office or other facility, regardless of the existing connection capabilities within that facility. Thus, network 100 can be implemented to avoid the need to cable a backbone network over the "last mile" to each facility 104. The nodes 108 can be connected to the network 100 as described in U.S. patent application Ser. No. 09/181, 062 entitled System and Method for Integrating a Network Node, filed Oct. 27, 1998, which is incorporated herein by reference in its entirety.

At least one of nodes 108 can be designated as a root node 108A. Root node 108A includes additional functionality to interface the communication network 100 to a provider network 116 via another communication link 112. The provider network 116 can, for example, be a high bandwidth copper or fiber service provider or common-carrier network 116.

A root node 108A of the communication network 100 receives a communication from the provider network 116. The root node 108A accepts the communication and, if necessary or desired, reformats the communication into a format that can be transported across the network of nodes 108 and communication links 110. For example, in an example where network 100 is a packet-switched network, root node 108A formats the communication into packets suitable for transmission across the optical communication links 110.

The root node 108A may also determine routing information such that the data can be sent to the appropriate destination node 108, also referred to as a premise node 108. In a network 100 using packet data, the routing information can be included in the packet header of the packets being sent across network 100. In alternative network geometries, a designation of the destination node 108 may be used in place of or in addition to routing information. For example, ring geometries use destination information as an address for the packets in place of routing information.

The root node 108A routes the reformatted data across the network 100 to the designated destination node 108. The route may be directly to destination node 108 or via one or more intermediate nodes 108, which are referred to as junction nodes 108 in this capacity. In embodiments using packet data, for example, junction nodes 108 may use packet header information to route a received packet to the next node 108.

The destination node 108 receives the data. The received data is forwarded to the end user at the facility 104 associated with the destination node 108. Prior to forwarding the data to the end user, the data is reformatted into a telecommunications format such as, for example, the original format that the data was in when it was received from provider network 116.

In this example, the fact that the user is interfaced to the provider network 116 via the network of links 110 and nodes 108 is preferably transparent to the user. Communications from the user to the provider network 116 can similarly take place, but in the reverse order. Thus, network 100 can provides a two-way connection between one or more users in one or more facilities 104 with provider network 116. Although only one provider network 116 is illustrated in FIG. 1, one or more root nodes 108A can be used to interface to more than one provider network 116 in alternative embodiments.

Thus, a service provider can provide service to users in a plurality of facilities 104 by providing a signal to the root node 108A of the system. In one example, nodes 108 use the Asynchronous Transfer Mode (ATM) as the data transport mechanism.

Figure 2:
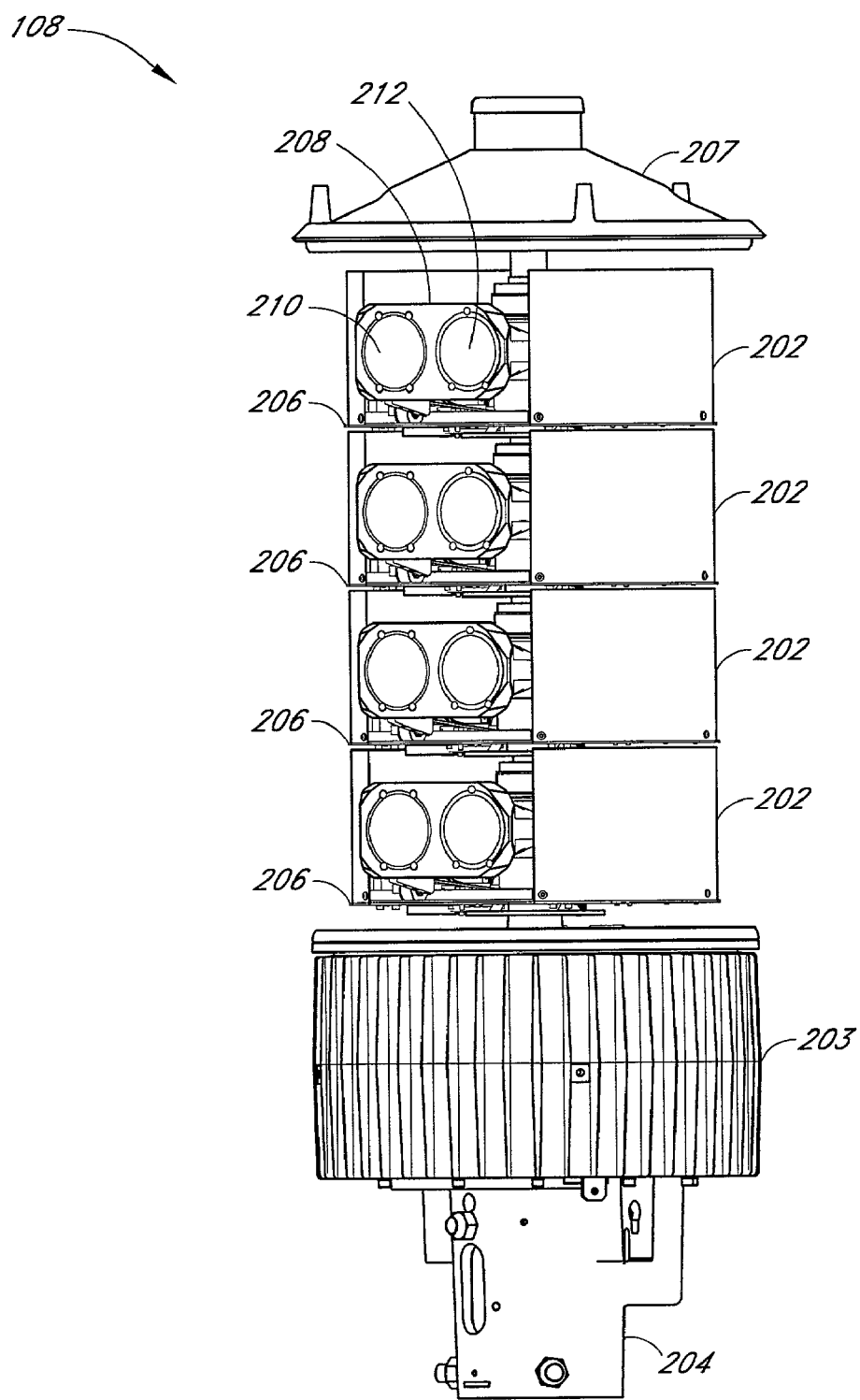
FIG. 2 is a perspective view of an embodiment of a node for use in the communication network of FIG. 1.

FIG. 2 shows one embodiment of the node 108. Node 108 as shown in FIG. 2 includes four node turrets 202, an electronics section 203, a base mount 204 and a lid 207. Each node turret 202 includes an azimuth plate 206 that is rotatably attached to the node 108 as will be discussed below. A transceiver 208 to facilitate communication with one or more other nodes 108 in the network 100 (FIG. 1) is mounted on each azimuth plate 206. In one embodiment, there is a single transceiver 208 in each node turret 202, and each transceiver 208 provides a communication link 110 (FIG. 1) with one other node 108 in the network 100 at a given time. The four node turrets 202 allow each node 108 to connect its associated facility 104 (FIG. 1) with up to four other nodes 108. Other numbers of turrets 202 can be included, depending on the fan-out capability desired for the node, 108.

Each transceiver 208 can have both a receiver 210 and a transmitter 212, providing two-way communications. However, in alternative embodiments, the transceiver 208 could have just a transmitter 212 or just a receiver 210, thereby providing one-way communications. Additionally, it is possible for one or more node turrets 202 to include more than one transceiver 208, or an additional receiver 210 or transmitter 212 to provide additional capabilities, for example such as an RF transceivers. As stated, in one embodiment, the transceivers 208 are optical transceivers, however, alternative wireless transceivers can be implemented operating at wavelengths other than optical wavelengths. In optical embodiments, transceivers 208 at nodes 108 can be implemented using for example, lasers or light emitting diodes (LEDs) as the optical transmitters 212 and charge-coupled devices (CCDs), photomultiplier tubes (PMTs), photodiode detectors (PDDs) or other photodectectors as the receivers.

In one class of optical transceiver 208, the optical transmitter 212 and the optical receiver 210 are fixed relative to each other. Hence, both the direction of the optical transmitter 212 and the direction of the optical receiver 210 change in the same manner with the movement of the transceiver 208. In one embodiment, the transmitter 212 and receiver 210 are boresighted to each other during manufacture, such that bi-directional pointing accuracy can be established and maintained. The communication link between two terminals is established by an acquisition process in which two suitable transceivers 208 respectively located in two different nodes 108 are pointed at each other and are aligned. After the two-way communication is established, information can be transferred between the two nodes 108. The electronics section 203 contains a processor board (not shown) with a controller, for example, a microprocessor (not shown). The controller points the transceiver 208 as will be described more fully below.

Figure 3:
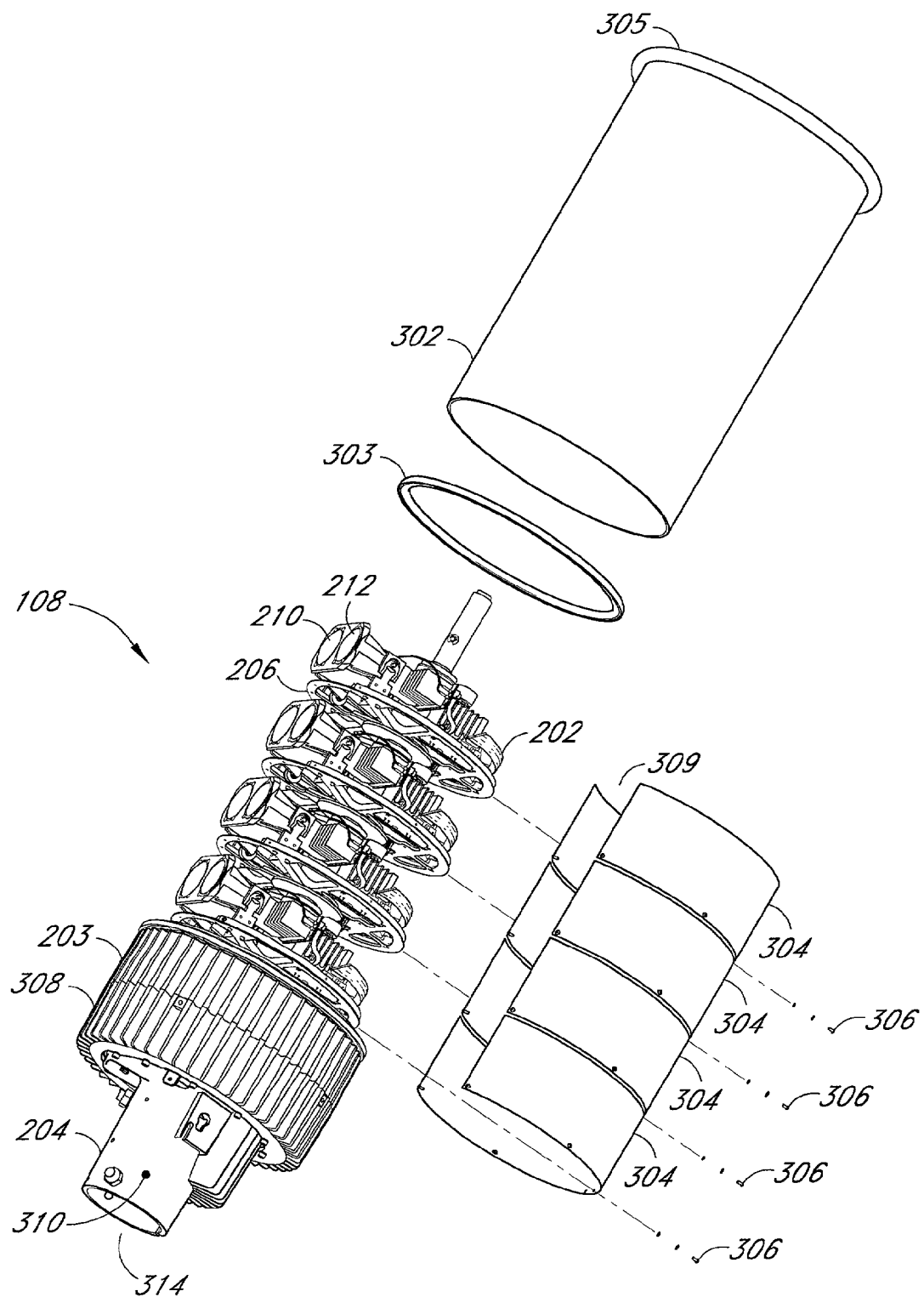
FIG. 3 is an exploded view of the node of FIG. 2.

FIG. 3 is an exploded view of the node of FIG. 2. FIG. 3 illustrates that the node 108 is generally cylindrical in shape and turrets 202 are enclosed in a cylindrical radome 302. An advantage of the cylindrical shape is that it facilitates the ability to point the turrets 202 to other nodes in a full 360-degree circle. Another advantage of this shape is that an optical communication beam always passes at a substantially right angle with respect to the radome 302 surrounding the node 108, regardless of pointing direction of the turret 202. This helps to maximize the transmitted beam power. Of course, alternative shapes for the node 108 can be implemented as well.

The radome 302, in one embodiment, is a clear polycarbonate housing, transparent to the wavelength of the communication link. Alternately, other materials such as acrylic and lexan can be used for the radome 302. Additionally, the radome 302 can be tinted, such as deep red, to provide thermal protection to the inner components. The radome 302 can also serve as a filter to filter out unwanted noise from wavelengths other than that of communication link. For example, in one embodiment, where the communication wavelength is 780 nanometers (nm), the radome 302 can provide a 780 nm band pass filter. In one embodiment, the radome 302 is approximately $\frac{1}{8}^{th}$ inch thick and twelve inches in diameter, although other dimensions are possible. In one embodiment, the interior surface of the radome 302 has a thin Indium Tin Oxide coating that acts as a conductor that allows a current to pass and resistively heat the radome 302 and provide EMI shielding. The radome 302 can be fabricated from two half pieces of polycarbonate material that are joined together in such a way as to preserve the clarity of the polycarbonate material. The exterior dimensions of the radome 302 are minimized to the extent possible based on the size and placement of components of node turret 202 to minimize external forces such as wind loads. Alternatively, a single polycarbonate cylinder can surround each of the node turrets 202 in the node stack.

A first custom elastomeric extrusion 303 positioned between the electrical portion 203 and the radome 302 provides a seal to keep out moisture or other undesirable elements. In one embodiment, the elastomeric extrusion is positioned in a groove (not shown) in the electrical portion 203 into which the bottom edge of the radome 302 fits to provide a good seal. A second custom elastomeric extrusion 305 is similarly positioned between the lid 207 (see FIG. 2) and the top edge of the radome 302. The elastomeric extrusions 303 and 305 can be made of rubber, a rubber-like or polymeric material.

A sunshield 304 is attached to each of the azimuth plates 206 and surrounds a portion of each turret 202. The sunshield 304 can be of polished aluminum to reduce the thermal loading of the node 108. Other materials such as mirrored plastic can be used. The sunshield 304 moves with the azimuth plate 206 so an opening 309 in the sunshield 304 remains aligned with the transmitter 212 and receiver 210 allowing optical beams to reach the transmitter and receiver. Screws 306, snaps or other fasteners attach the sunshields 304 to each turret 202.

Note that in one embodiment, one or more node turrets 202 can be implemented with the communications equipment to allow them to communicate with equipment other than another node 108. This equipment can be implemented using, for example, wireless RF communications or other communications techniques. However, in a preferred embodiment, node turrets 202 are dedicated to inter-node communications via communication links 110.

The electronics section 203 can include the electronics and mechanics (not shown) to provide the communications interface 112 (FIG. 1) between, for example, the network 116 (FIG. 1) and the one or more node turrets 202. In one embodiment, the electronics section 203 provides a path for conducting heat from the node 108. Thus, electronics section 203 includes heat fins 308 to help cool the node 108 by convection.

The base mount 204 provides a physical mount with which the node 108 can be mounted to the facility 104 (FIG. 1). A locating pin hole 310 on the base mount 204 receives a locating pin (not shown) that is also passed through a slot (not shown) on a tripod parapet or other mounting fixture on the facility 104 (FIG. 1). Thus, the node 108 is oriented with respect to the facility such that any other node will be placed in the exact same orientation with respect to the tripod parapet at the facility within the machining tolerance of the slot and locator pin hole as long as the tripod parapet is not altered.

A mechanical interface 314 can be included to provide an interface for power and signal lines and cables from facility 104 to node 108. The mechanical interface 314 provides a degree of protection from the elements, restricting moisture or other undesirable elements from gaining access to node 108.

In the case of a relatively narrow beam-width signal, it is desirable that the transmitter 212 and receiver 210 of a node 108 be pointed with a certain degree of precision to that of another node 108. This is especially important in applications where communication links are implemented as optical communication links, where the optical signal has a relatively narrow beam waist and a small divergence. Additionally, accurate pointing is somewhat dependent on accurate positioning of nodes 108 within the network.

The position and bearing information of the subject node 108, coupled with the position information of other nodes 108 in the network 100, allows pointing information for the node 108 to be determined. Pointing angles for one or more transceivers 208 in the subject node 108 is determined with a fair degree of accuracy using this information in a simple triangulation computation. In other words, if the positions of the pertinent nodes 108 in network 100 are known, it is a straightforward geometric computation to determine where to point a given transceiver 208 within the subject node 108, such that the transceiver 208 is in alignment with a desired other node 108 in the network 100.

Therefore, positioning components can be provided to facilitate the installation and integration of one or more nodes 108 within a network such as the above-described optical communication network 100. These positioning components are now described in terms of an embodiment suitable for operation with the above-described optical communication node 108. After reading this description, however, it will become apparent to one of ordinary skill in the art how the positioning components can be implemented for use in other applications where pointing or positioning are desired to be achieved with a certain level of precision.

Figure 4:
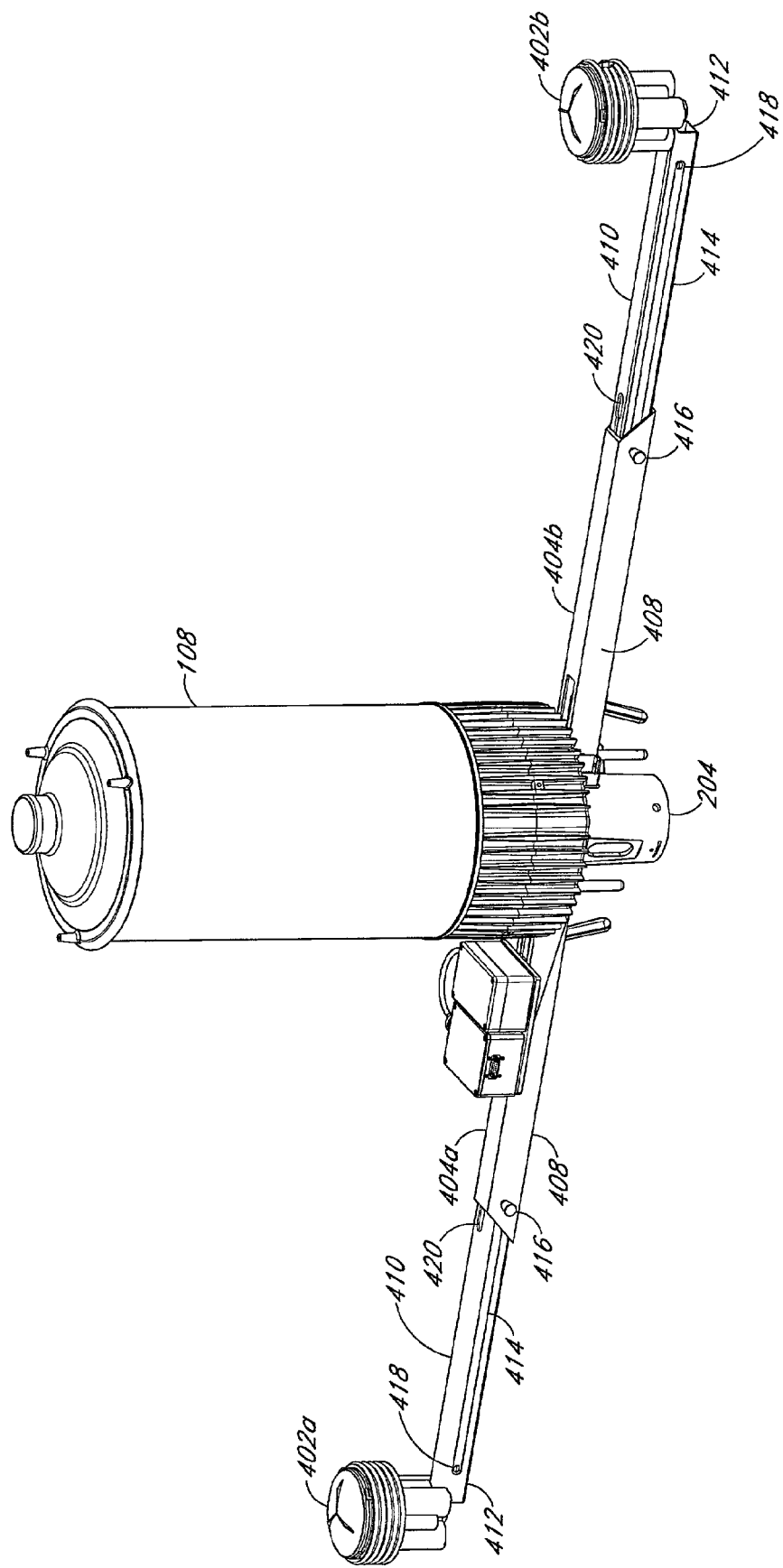
FIG. 4 is a perspective view of an embodiment of the node of FIG. 2 with GPS receivers mounted on the node.

FIG. 4 illustrates an example implementation of two global positioning system (GPS) receivers 402 (a) and (b) mounted on the node 108. In one embodiment, each GPS receiver 402 is capable of receiving GPS positioning information to enable determination of a location of the node turret 202. In one embodiment, differential GPS is used to obtain increased accuracy in position determination over that of conventional GPS receivers. In certain embodiments using differential GPS, the position determination can be made to the meter or sub-meter accuracy level. The GPS receivers 402 each provides X, Y and Z position determination relative to an earth-based reference such that the exact location of the positioning system can be determined.

In one embodiment, the service for the differential GPS receiver 402 is provided by Fugro's Omnistar service. This service utilizes a geostationary satellite to provide positioning information good to approximately one meter. Other positional systems can be used such as, for example, DCPGPS, traditional non-differential GPS, loran, or other positioning services or devices. Although a node 108 can be manually surveyed by a surveyor for position determination, it is preferable that an automated device such as, for example, a GPS receiver 402 be utilized. Such devices enable automated and more rapid position determination of the positioning system. Once determined, the position information, usually expressed in terms of position coordinates (e.g., X, Y, Z position), is provided a network controller (not shown) so that position coordinates from the various nodes 108 can be correlated and pointing information calculated.

The position data can then be used by the nodes 108 for orientation purposes. Each transceiver 208 can be automatically oriented to point to a desired transceiver 208 in another node based on the position data.

The GPS receivers 402 are attached to the base mount 204 with GPS mounting arms 404. It is desirable that the GPS receivers 402 be precisely attached in a determined configuration such that positional information for the GPS receivers can be converted into accurate position information of the node. In one embodiment, two GPS receivers 402(a) and 402(b) on two GPS mounting arms 404(a) and 404(b) are attached to the base mount 204. The mounting arms 404 are attached to the base mount approximately 180 degrees apart to maximize the separation between the GPS receivers 402. To increase the portability of the GPS mounting arm 404, each mounting arm includes an outer portion 408 and a telescoping inner portion 410 that retracts into the outer portion 408. The GPS receiver 402 is mounted to a first end 412 of the inner portion 410. The inner portion 410 contains a groove 414 along a substantial length of one side of the inner portion 410. A set pin 416 travels within the groove 414 and engages a first locking hole (not shown) within the groove 414 in a second end 420 of the inner portion 410 to lock the mounting arm 404 in an extended position. The set pin 416 engages a hole 418 in the first end 412 of the inner portion 410 to lock the mounting arm 404 in a stowed position. One skilled in the art will be able to conceive of alternative ways to provide telescoping or folding features to the mounting arm to increase the portability of the arm, and these alternative ways likewise should be considered part of the invention.

Figure 5:
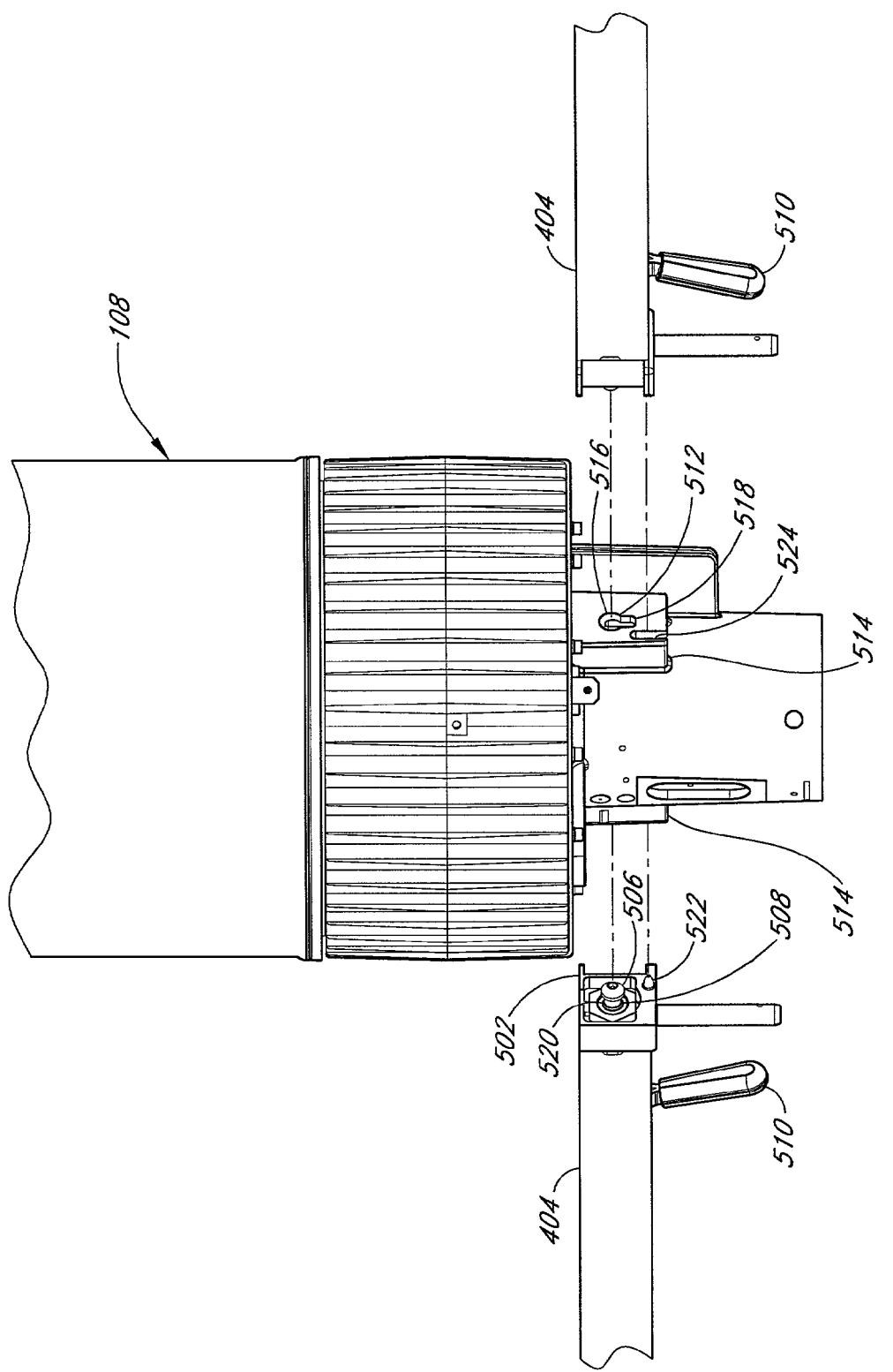
FIG. 5 is an exploded view of an embodiment of the node with GPS receivers of FIG. 4 illustrating the mounting features of the node and GPS mounting arms.

FIG. 5 illustrates that an embodiment of the mounting arm 404 includes a mounting end 502 with a clamp head 506. The claim head 506 is attached to one end of a clamp shaft 508. A handle 510 is attached to a second end of the clamp shaft 508. The mounting end 502 of the GPS mounting arm 404 is configured to engage a keyhole 512 in a mounting box 514 on the base mount 204. The keyhole 512 is precision machined in the mounting box 514 and the mounting box is precision mounted to the base mount 204 so that accurate alignment is maintained between the GPS receivers 402 and the base mount 204. This allows positional information received by the GPS receivers 402 to be translated into positional information for the node 108.

The keyhole 512 has an upper circular portion 516 with a circumference larger than the circumference of the clamp head 506 and a lower portion 518 in communication with the upper portion 516 that has a circumference smaller than the circumference of the clamp head 506. The clamp head 506 is inserted into the keyhole 512 such that the clamp head 506 is received into the mounting box 514 through the upper portion 516 of the keyhole 512. The GPS mounting arm 404 is then slid downwards such that the shaft 508 of the clamp head 506 is positioned in the lower portion 518 of the keyhole 512, such that a flat rear surface 520 of the clamp head 506 contacts the mounting box 514 preventing withdrawal of the clamp head 506. The handle 510 is manipulated to retract the clamp head 506 such that a frictional fit is achieved locking the mounting arm 404 onto the base mount 204.

The mounting end 502 also includes an alignment guide pin 522 extending from the mounting arm 404. The alignment guide pin 522 is received in a first alignment slot 524 in the mounting box 514. The alignment guide pin 522 and alignment slot 524 configuration allows the mounting arm 404 to be attached to the node 108 in a single alignment orientation. In this embodiment, the alignment guide pin 522 and alignment slot 524 allow a technician installing the GPS receiver 402 onto the node 108 to ensure that the two pieces are properly aligned with one another. These components can further insure that this alignment does not change during the installation process.

In one embodiment, the GPS mounting arm 404 is of sufficient length to provide a one-meter separation between the GPS receivers 402 and the node. The two GPS receivers 402 are positioned on opposite sides of the node 108, or 180 degrees apart, such that there is a two-meter separation between the GPS receivers 402 when obtaining the position measurements. The use of two GPS receivers 402 separated by a determined distance allows the bearing of the node 108 to be determined. Alternately, other lengths of mounting arms 404 can be used to provide a greater or smaller separation. The mounting arms 404 can be anodized and Teflon coated to provide durability.

In one embodiment, the GPS receivers 402 provides a bearing relative to geographic north. Tiltmeter 602 provides a bearing to ⅓ degree to ½ degree of accuracy, which as discussed below, is sufficient to allow transmitters 212 and receivers 210 to be initially pointed to the desired node 108. Alternative accuracy ranges can be used depending on the distance between nodes 108, transmit beam divergence, and receiver aperture.

Once the positional information has been obtained, the GPS receivers 402 can be removed from the node 108. In this embodiment, the mounting arms 404 are provided such that they can be easily released from the node 108 after the position data is obtained. The removal can be done without having to be concerned that the position and orientation of the node 108 has been affected or altered due to the removal of the mounting arms 404. In yet another alternative, each node 108 can include at least one GPS receiver permanently attached to the node to enable the initial pointing operations. However, this alternative may be undesirable as the costs of the GPS receivers are incurred for each of the nodes 108 having these components. Therefore, it is advantageous that these GPS receivers 402 and mounting arms be removable from the node 108.

Figure 6:
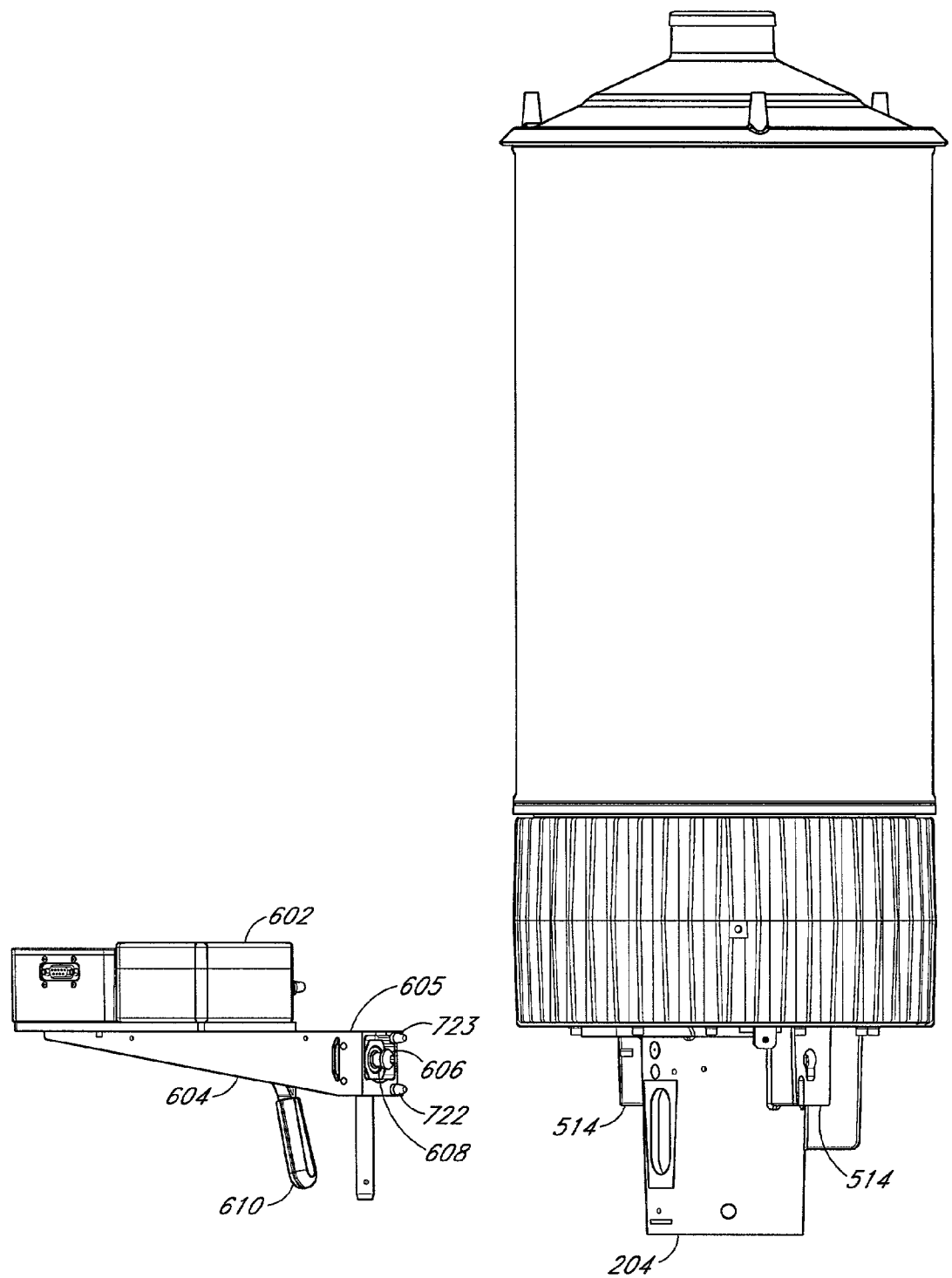
FIG. 6 is a perspective view of an embodiment of the node of FIG. 2 with a tiltmeter capable of being mounted on the node.
Figure 7:
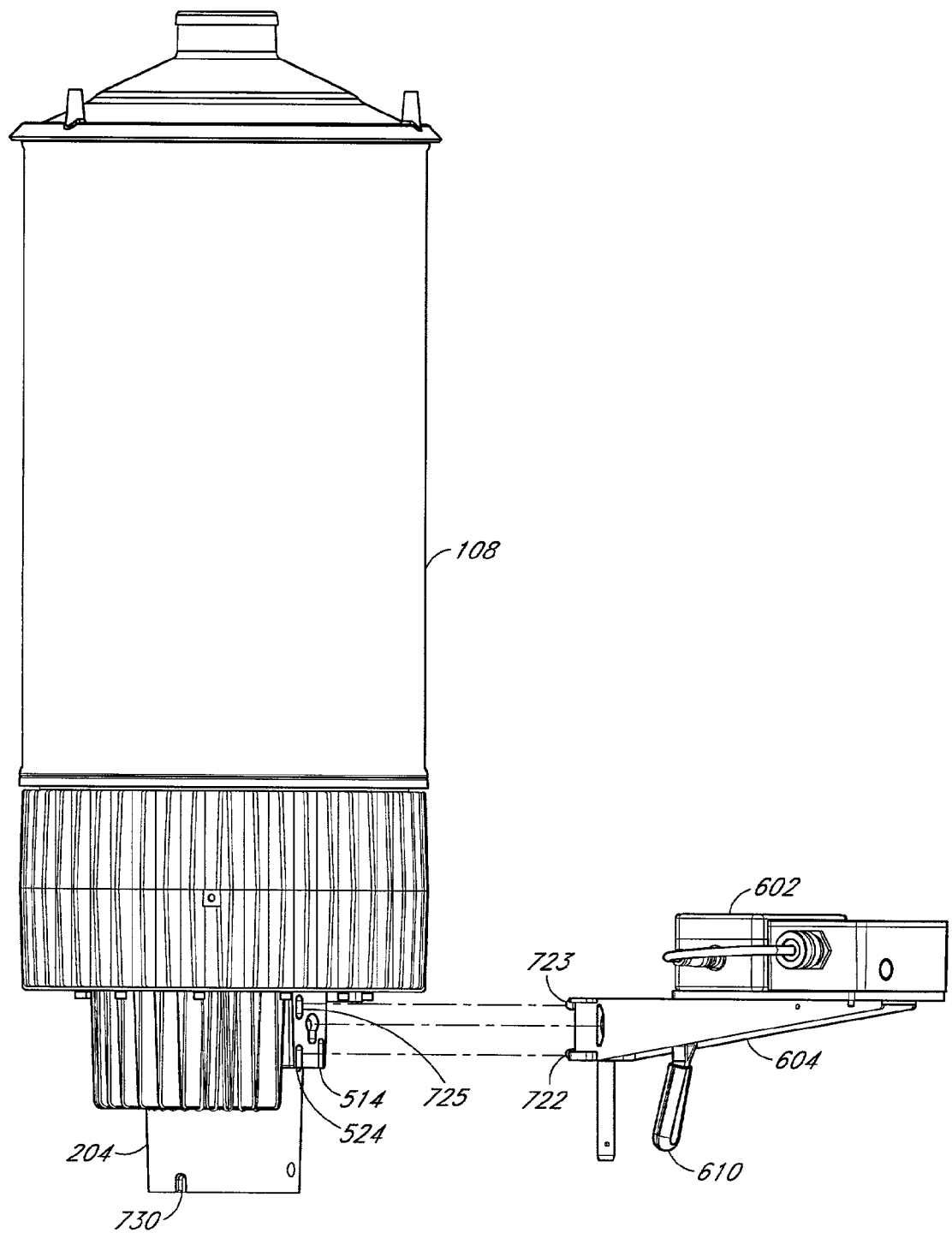
FIG. 7 is an alternate perspective view of the node and tiltmeter of FIG. 6 illustrating the mounting features of the node and tiltmeter mounting arm.

FIGS. 6 and 7 illustrate a second part of the positioning system, which includes a tiltmeter 602 that can be mounted to the base mount 204 in similar fashion as the GPS receivers 402. After the GPS receivers 402 and GPS mounting arms 404 have been removed, one of the mounting boxes 514 previously used to receive one of the GPS mounting arms 404 is used to receive the tiltmeter 602. The tiltmeter 602 is mounted on a tiltmeter mounting arm 604. The tiltmeter mounting arm 604 has a mounting end 605 with a clamp head 606 attached to a first end of a shaft 608 similar to the GPS mounting arm 404 of FIG. 4. A handle 610 is attached to a second end of the shaft 608.

The clamp head 606 is received in the upper portion of the keyhole 512 and is slid into a locking position as described above with respect to the GPS mounting arm 404. The mounting end 605 of the tiltmeter 602 includes two alignment guide pins 722 and 723. The first alignment guide pin 722 is received into the first alignment slot 524 that was also used in conjunction with the GPS mounting arm 404 (of FIG. 4). The second alignment guide pin 723 is received in a second alignment slot 725 in the mounting box 514. In one embodiment, only one mounting box 514 on the node 108 contains the second alignment slot 725 such that there is only one mounting box 514 that will receive the tiltmeter mounting arm 604. This ensures that the tiltmeter 602 is installed in the desired orientation with respect to the node 108 and that the two components are properly aligned with one another in a repeatable manner. The alignment guide pins 722 and 723 and alignment slots 724 and 725 further insure that this alignment does not change during the installation process.

The tiltmeter 602 provides a determination of the pitch and roll. Because the tiltmeter 602 is aligned with the base mount 204 through the tiltmeter mounting arm 604 and mounting box 514, the pitch and roll of the tiltmeter 602 can be used to determine the pitch and roll of node 108. Therefore, it is advantageous to have only a single point of attachment on the node so that the orientation of the node can be accurately determined. Thus, in this embodiment, the tiltmeter 602 can provide information important to the leveling of the node 108 to which the tiltmeter 602 is attached. For example, roll and pitch information can be used to determine whether the node 108 is level, or how far off of level the node is. This leveling information can be used to help level the node, or can be provided to the pointing systems to allow the roll and pitch offsets of the node to be taken into account in determining pointing angles to other nodes. From this information, the pointing of the one or more transceivers 208 with node 108 can also be determined. The tiltmeter 602 can be a tiltmeter such as those available from Applied Geomechanics.

As one skilled in the art can envision, other methods of precisely aligning the GPS receivers 402 and tiltmeter 602 to the node 108 can be used. For example, a precision-machined slot 730 can be machined into lower edge of base mount 204. A clamp (not shown) can be used to attach the mounting arms to the base. The precision-machined slot clocks the mounting arms 404 and 604 to the base mount 204 in such a way that precise alignment and registration is achieved and accurate position information is translated to the node.

Figure 8C:
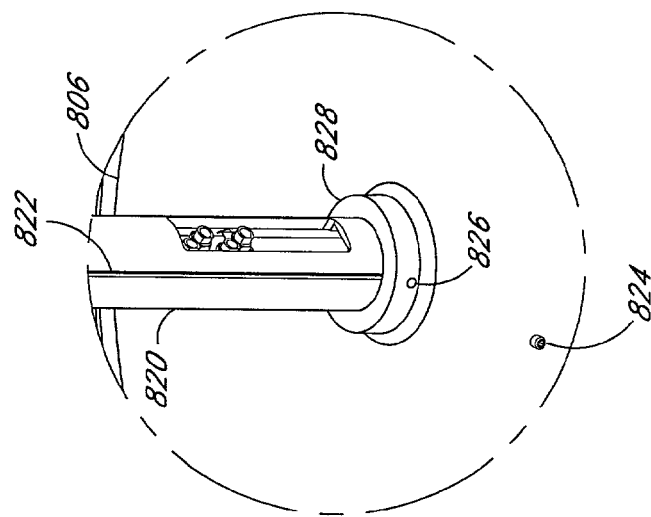
FIG. 8c is a detail view of a section of FIG. 8b illustrating the v-groove on the king post.
Figure 8B:
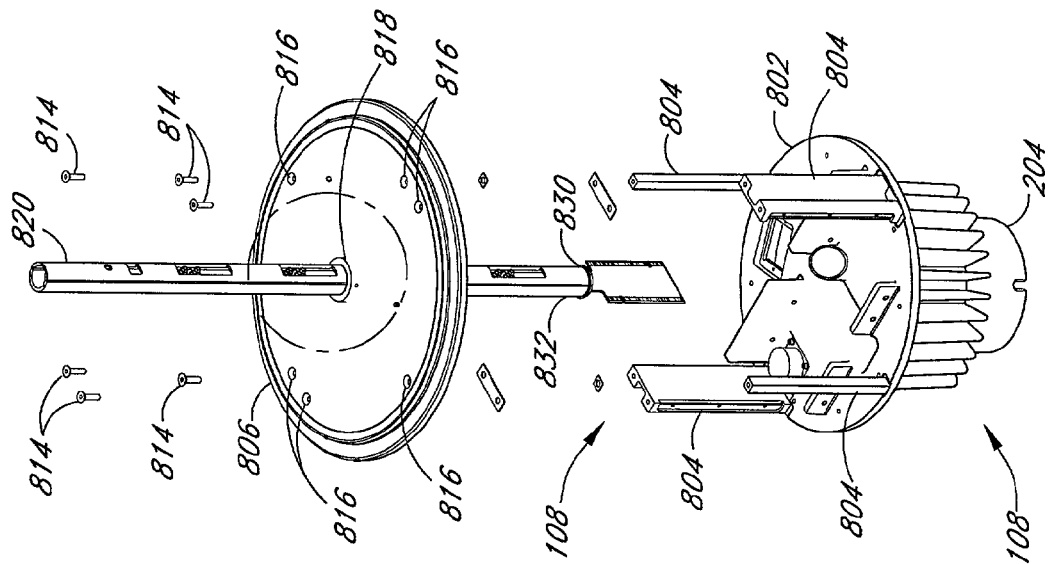
FIG. 8b is an exploded view of the lower section of the node of FIG. 2 further illustrating the bulkhead and king post.
Figure 8A:
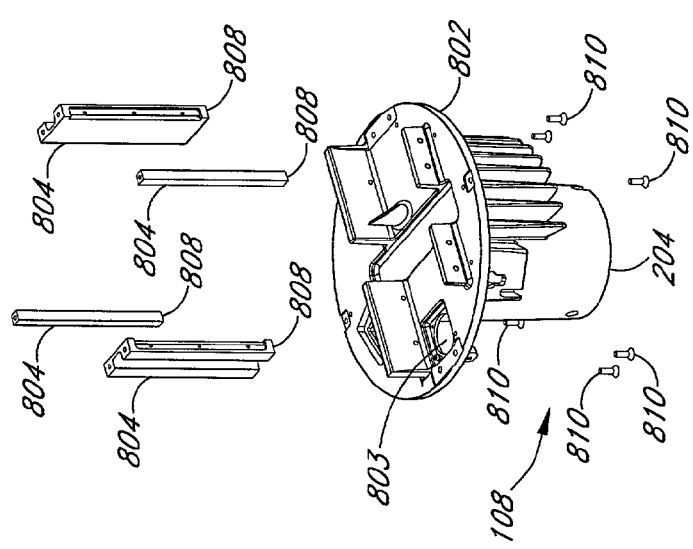
FIG. 8a is an exploded view of the lower section of the node of FIG. 2 illustrating the base mount and base plate.

The position and alignment information is translated from the GPS receivers and tiltmeter 602 to the base mount 204 as described above. Precision aligned components in the node translate this information to the turrets 202 as will be described with reference to FIGS. 8–10. FIG. 8a illustrates one embodiment of the construction of the lower portion of the node 108. The base mount 204 includes a substantially circular base plate 802. The base plate 802 is provided with an opening 803 covered by a Gore-Tex patch (not shown) that allows the passage of air into and out of the node 108, thus allowing the pressure in the node 108 to equalize with the surroundings, reducing pressure differences that could be caused by daily and seasonal barometric loading. The patch can also be made from other breathable materials. Pillars 804 attach a circular bulkhead 806 (FIG. 8b) to the base plate 802. In one embodiment, four pillars 804 are used. A first end 808 of each pillar 804 is attached to the base plate 802 with screws 810 or other fasteners. FIG. 8b illustrates that a second end 812 of each pillar 804 is attached to the bulkhead 806 with screws 814 or other fasteners. Screw holes 816 in the base plate 802 and the bulkhead 806, as well as the pillars 804, are aligned and precision-machined so that the bulkhead 806 is properly aligned with the base mount 204.

The bulkhead 806 has a circular hole 818 in the center therein. A king post 820 is inserted through the hole. The king post 820 is a hollow tube used to distribute electrical leads and cables, including power, to/from the turrets 202 (see FIG. 2) and the base mount 204. FIG. 8c, a detail section from FIG. 8b, illustrates that the king post 820 has at least one, ideally two, precision-machined v-groves 822 running a substantial length of the king post 820. "V" point set screws pass 824 through holes 826 in a neck 828 in the bulkhead 806 around the circular hole 818 and engage the king post v-groove 822, thereby aligning the king post 820 with respect to the bulkhead 806 and thus the base mount 204.

Returning to FIG. 8b, the king post 820 is secured into position with respect to the bulkhead 806 by a spiral retaining ring 830. The spiral retainer ring 830 fits in appropriately sized groove (not shown) in the exterior surface of the lower end portion 832 of the king post 820. The retaining ring 830 is a non-expanding double-spiral retaining ring. The retaining ring 830 has a circumference larger than the circular hole 818 such that the retaining ring 830 prevents the king post 820 from being pulled through the circular hole 818.

Figure 9B:
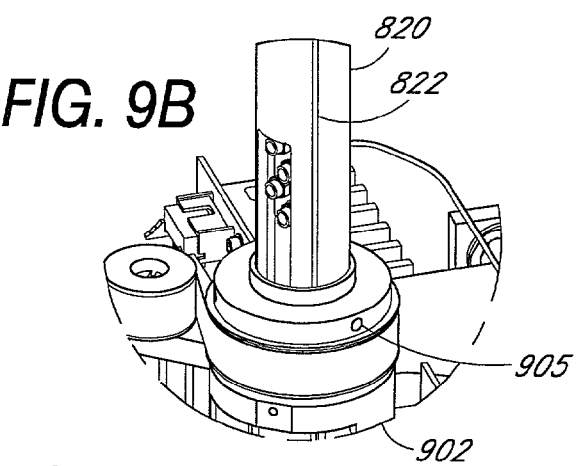
FIG. 9b is a detail view of a section of FIG. 9a illustrating the v-groove on the king post.
Figure 9A:
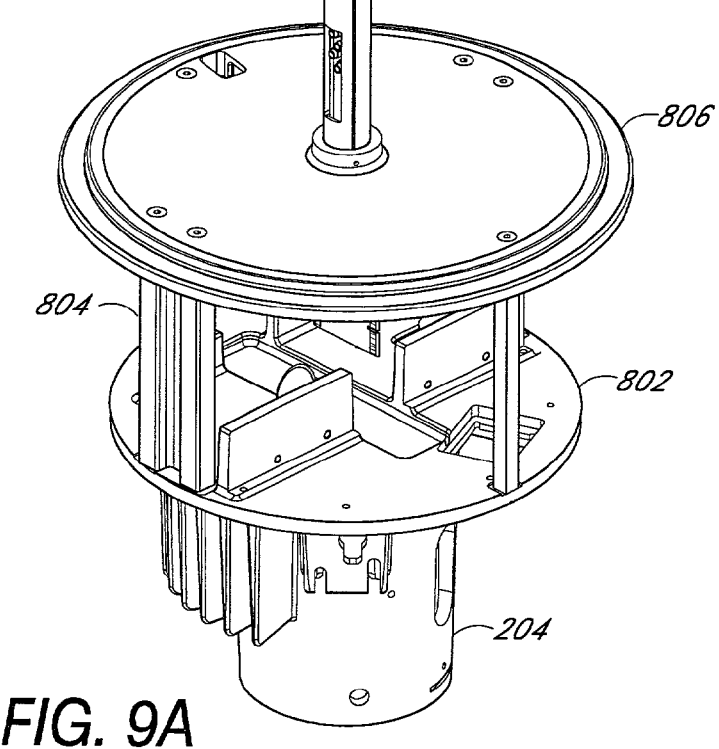
FIG. 9a is a perspective view of the lower section of the node of FIG. 2 with a turret attached to the king post.

FIG. 9a illustrates that the turrets 202 are stacked above the bulkhead 806. As mentioned above, in one embodiment, node 108 contains four turrets 202. Each turret 202 has an azimuth plate 206 and an inner hub gear 902 with a precision center bore (not shown) therein such that the king post 820 is received in the hole. FIG. 9b, a detail section of FIG. 9a, illustrates that the inner hub gear 902 slides over the king post 820 and is aligned to the king post 820 using set screws (not shown) that pass through precision aligned vertical slots 905 in the inner hub gear 902 and engage the v-groove 822 of the king post 820. The set screws (not shown) align the turret 202 to the king post 820. The azimuth plate 206 is rotatably attached to the inner hub gear 902 such that the azimuth plate 206 can rotate around the king post 820.

Figure 10A:
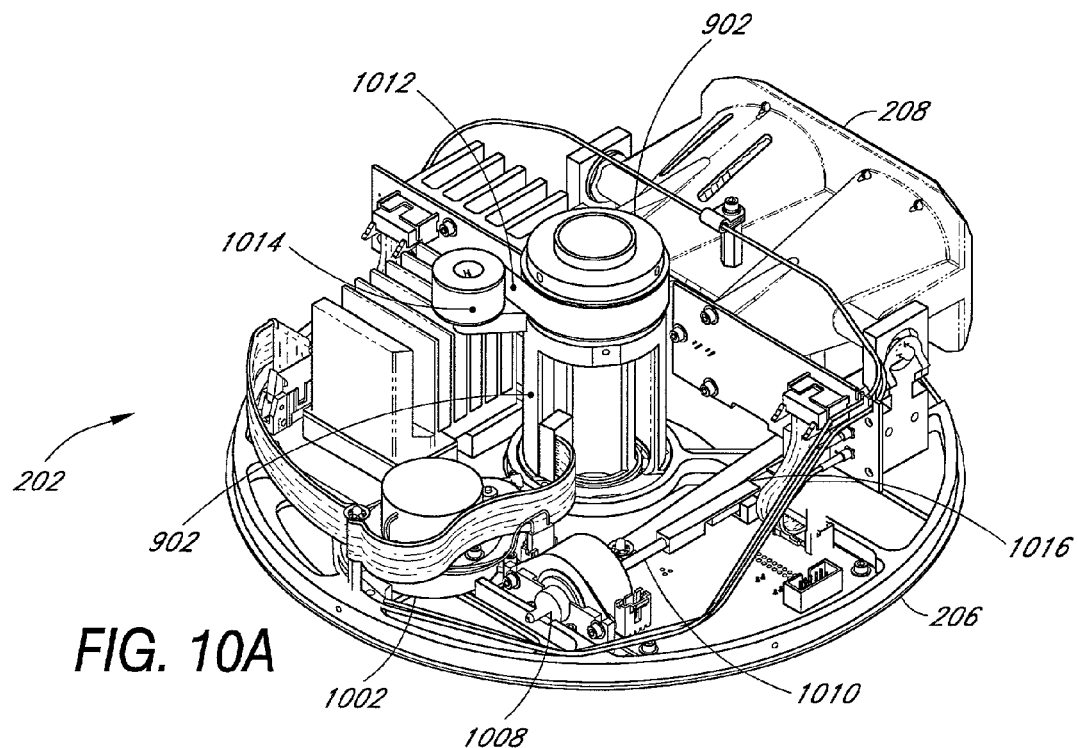
Figure 10B:
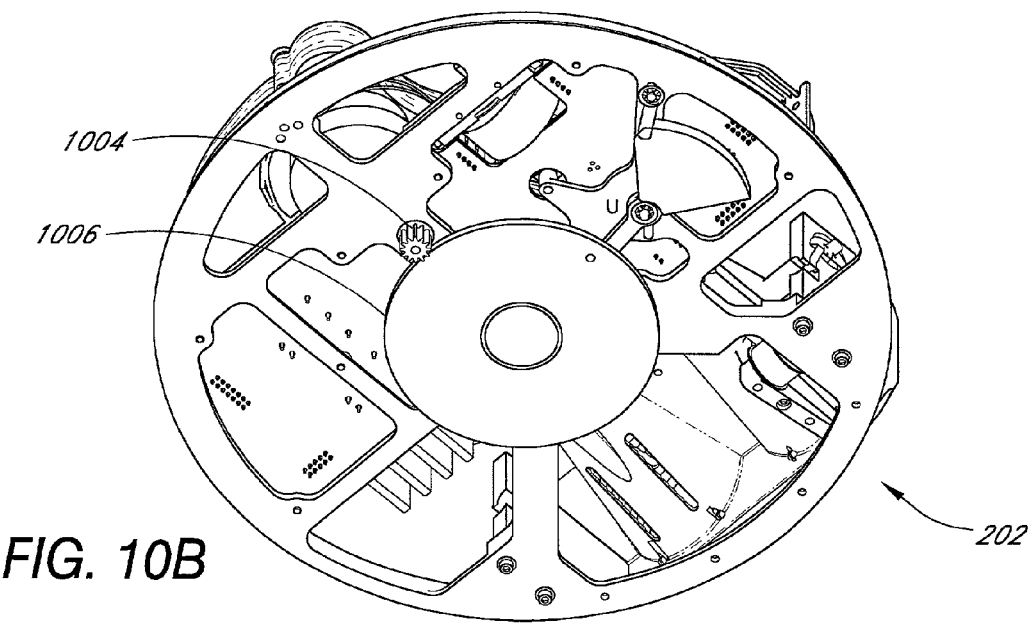

FIG. 10A illustrates a top view embodiment of the turret 202. An azimuth stepper motor 1002 is mounted on the azimuth plate 206. FIG. 10B is a bottom view of the turret of FIG. 10A and illustrates that the azimuth stepper motor 1002 is attached to a spur gear 1004 that meshes with a planetary gear 1006 mounted on the inner hub gear 902. The spur gear 1004 and the planetary gear 1006 driven by the azimuth stepper motor 1002 control the rotation of the azimuth plate 206 around the king post 820. In one embodiment, the azimuth stepper motor 1002 can rotate the azimuth plate 206 a total of 370 degrees about an axis in line with the king post 820. In this embodiment, the motor maintain its position, even when its drive coils are not energized.

An elevation linear stepper motor 1008 is mounted on the azimuth plate 206. The elevation stepper motor 1008 attaches to a rod 1010 that controls the elevation of the transceiver 208. In one embodiment, the elevation stepper motor 1008 is a linear actuator stepper motor that cannot be back driven with a 0.00025 inch advance per step giving 150 microradians (grads) per step. The elevation stepper motor 1008 in one embodiment provides a field of movement of ±20 degrees. Thus, provided another node 108 (not shown) is within the line of sight of transceiver 208, and within ±20 degrees of elevation, the two nodes 108 can be communicably connected.

The stepper motors 1002 and 1008 cause the transceiver 208 to rotate in azimuth or elevation in discrete steps. The transceiver 208 can be driven to a resolution that is approximately 10 times finer than the divergence of a transmit laser (not shown). Thus, in one embodiment where the divergence of the transmit laser beam is 1.5 mrads, the resolution of the gimbals is about 150 microradians (μrads). The stepper motors 1002 and 1008 are connected to a controller (not shown) in the electronics section 203 (see FIG. 2). The controller directs the movement of the stepper motors 1002 and 1008.

In an alternate embodiment, the stepper motors 1002 and 1008 drive toothed timing belts (not shown) that move the transceiver 208 through toothed pulleys (not shown) with a toothed belt arrangement that provides an arrangement that minimizes belt slippage. Other drive mechanisms can also be utilized.

The motors have about 1.57 mrad per step resolution and an appropriate turndown ratio. In one embodiment, the azimuth turn-down ratio is 10:1, and the elevation ratio is 12:1. In one embodiment, the azimuth stepper motor 1002 has an internal gear drive train ratio of 30:1, and with the planetary gear 1006, provides a total ratio of 300:1 to reduce the motor armature motion.

To provide for the precise control drive necessary for smooth operation of the transceiver 208, a first constant tension tensioner spring 1012 is provided to minimize backlash between the gears connecting the azimuth plate and throughout the drive train of the azimuth stepper motor. As is known, backlash can be defined as play between the gear teeth of intermeshing components such as the gears. Should backlash be evident in the control drive means for the turret 202, the positioning of the turret 202 would be less accurate in that backlash would allow the turret 202 to move in an indeterminate amount. The tensioner spring 1012 takes out the backlash by causing the teeth of the gears to ride on the same side of the opposing gear when stationary, independent of the preceding direction of travel.

The tensioner spring 1012 is coupled between the inner hub gear 902 and a suitable support on the azimuth plate 206. The tensioner spring 1012 is connected to a spool 1014 and is coiled thereabout and the spool 1014 is rotatable about the inner hub gear 902. The tensioner spring 1012 is adapted to impose a substantially constant bias upon all gears throughout the drive train of the azimuth stepper motor 1002, including the planetary gear 1006 and the spur gear 1004. As the planetary gear 1006 is rotated via the spur gear 1004, the tensioner spring 1012 coils about or uncoils from the spool 1014 maintaining the bias upon the gear holding the gear teeth in mesh with the adjacent gear teeth. In this fashion, backlash is prevented. A second tensioner spring 1016 is provided to minimize backlash in the elevation stepper motor.

Figure 11:
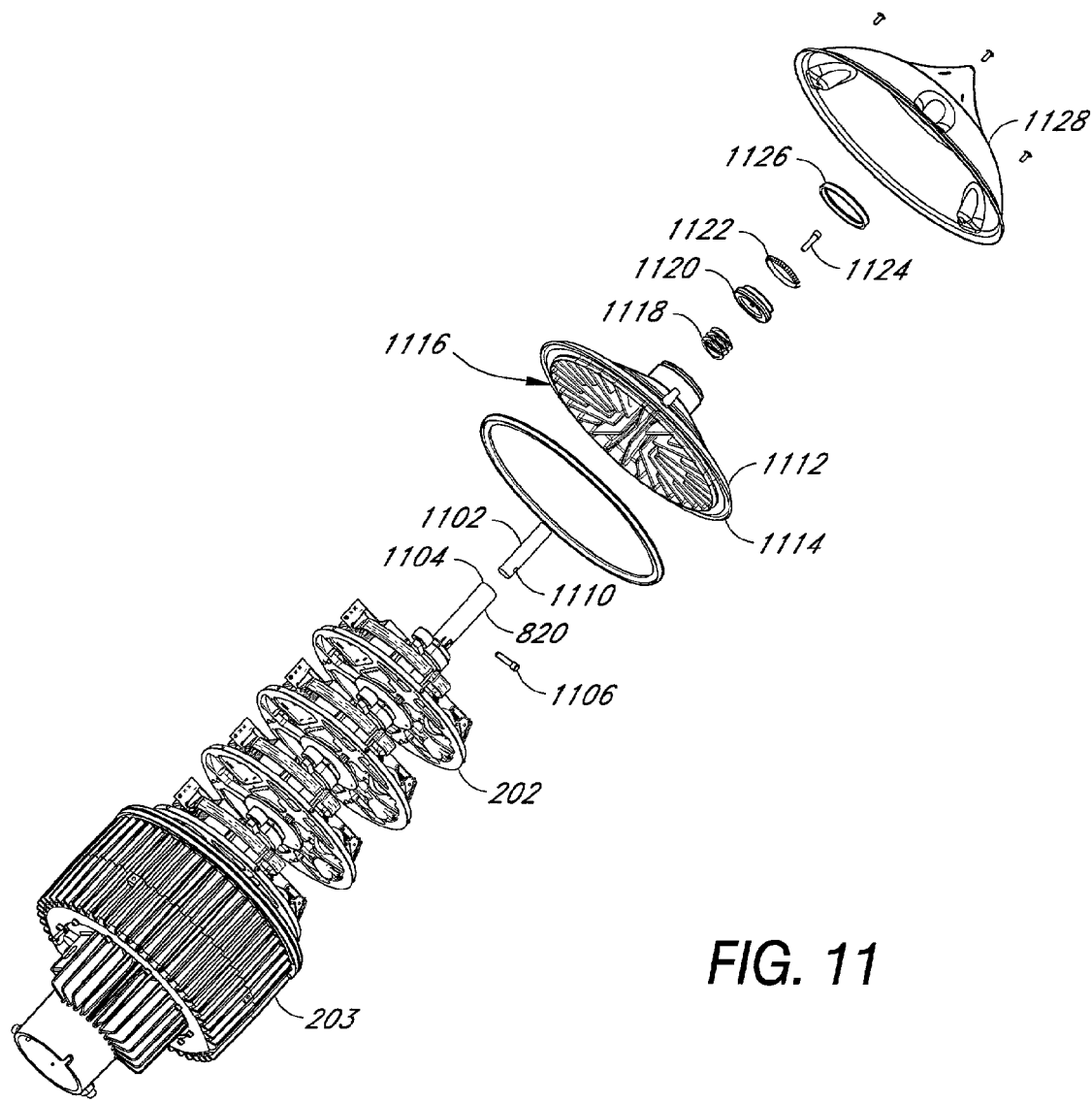
FIG. 11 is an exploded view of the upper section of the node of FIG. 2.

FIG. 11 is an exploded view of the node of FIG. 2, and illustrates that above the upper-most turret 202, a loading post 1102 is inserted into a hollow second end 1104 of the king post 820. A shear pin 1106 is inserted through holes 1108 in the kingpost 820 and in holes 1110 in the loading post 1102 to attach the loading post 1102 to the king post 820.

A lid 1112 is slid over the loading post 1102. The lid is configured with an airspace 1116 for convective cooling of the node 108. The loading pin 1102 passes through a circular hole in the lid 1112.

A spring 1118 is placed over the lid 1112. An EMI shield 1120 and a top cap 1122 are placed over the spring 1118. A tensioning screw 1124 is inserted through the top cap 1122 and engages threads (not shown) in the loading post 1102. Threading the tensioning screw 1124 into the loading post 1102 compresses the spring 1118. The compressed spring 1118 provides a on force on the lid 1112 that seat the radome 302 in the groove (not shown) in the lid 1112 and further seats the radome 302 against the electrical section 203 such that a weather tight seal is maintained around the radome 302 through daily variations in temperature. The king post 820 and the radome 302 are held in opposing tension and compression, respectively, to minimize titling of the kingpost 820 and provide stiffness. This minimizes alignment variation on the turrets 202 caused by the tilting of the kingpost 820 after the node 108 has been assembled. A rubber cap 1126 is secured over the tensioning screw 1124 to provide a weathertight boundary. A top cap 1128 is placed over the lid 1112, covering the rubber cap 1126. The top cap 1128 can be made of a light colored plastic to reduce the solar thermal load. In one embodiment, the shape of the cap 1128 sheds water away from the radome 302 and minimizes wind loads discourages perching of birds.

Preferably, there is sufficient space above the upper-most turret 202 to provide adequate air circulation. A thermoelectric or other temperature control device can be provided to maintain a desired equilibrium temperature. In one embodiment, an equilibrium of approximately 12 degrees C. above the ambient temperature is preferred to minimize condensation of ambient air.

After assembly of the node 108, a tolerance offset data value can be determined to account for summation of machining tolerances. For example, the tolerance offset could account for machining tolerances in the various components described above that connect the GPS receivers 402 and tiltmeter 602 to the base mount 204 and the components that connect the turrets 202 to the base mount 204, such as the king post 820 and pillars 804. The tolerance offset could also account for machining variations in attaching the transceiver 208 to the turret 202 through the stepper motors 1002 and 1008 and gears 1004 and 1006. By combining the mechanical components of the node 108 as described above and accounting for any actual offset from design values, a precise determination of the pointing direction for each transceiver 208 can be accomplished. The offset data values are stored in a non-volatile random access memory (RAM) (not shown) in the processor board. The node 108 can then be shipped and installed on a tripod parapet at a facility 104 (see FIG. 1) via the locating pin and set screws 310 as described above.

The three pieces of orientation data for a node, i.e., the X, Y, and Z position data and bearing from the GPS receivers, the pitch and roll information of the node from the tiltmeter 602 and the offset data stored in the RAM, are used to point the receiver 210 and transmitter 212 to another node 108 in the network. The orientation data can be sent to a central facility via a phone line or other communications network. The central facility can perform the mathematical calculations using the orientation data and the known location of the target node to calculate pointing directions to align the nodes. The central facility can supply the pointing directions back to the node as directions to the azimuth and elevation stepper motors. Therefore, there is the ability to quickly install and align a node 108. There is also an ability to replace nodes at a facility in the event the installed node becomes damaged or dysfunctional, allowing the link to other nodes in the network to be rapidly re-established.

Figure 12:
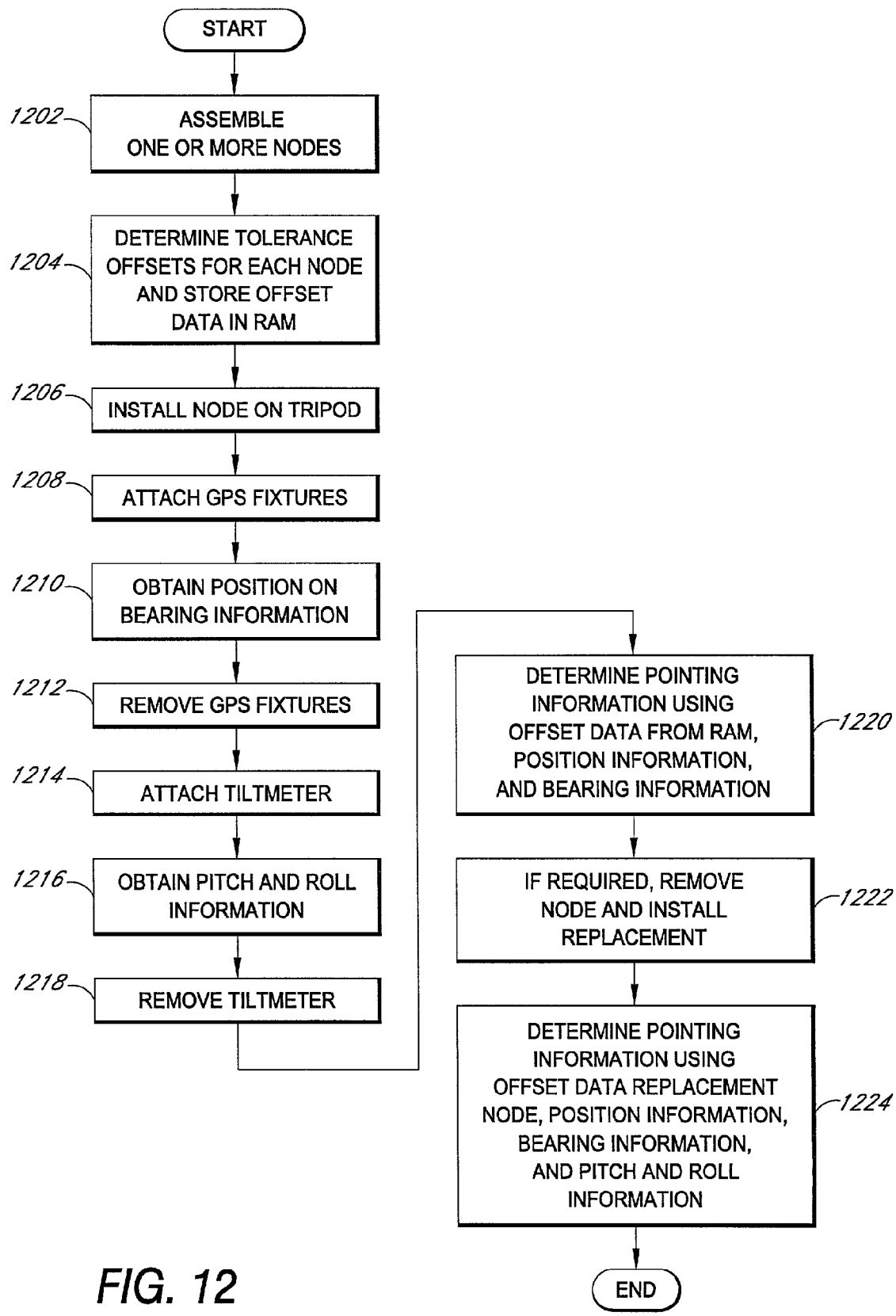
FIG. 12 is a block diagram of a method of aligning the node of FIG. 2.

A method of installing or replacing a node 108 in the network according to an embodiment of the invention is now described with reference to FIG. 12. In step 1202, one or more nodes are assembled as described above. In step 1204, the tolerance offsets for the individual node are determined and stored in the RAM. For example, the tolerance offsets could account for machining tolerances in the various components described above that connect the GPS receivers 402 and tiltmeter 602 to the base mount 204 and the component that connect the turrets 202 to the base mount 204, such as the king post 820 and pillars 804. The tolerance offset could also account for machining variations in attaching the transceiver 208 to the turret 202 through the stepper motors 1002 and 1008 and gears 1004 and 1006. In step 1206, the node is installed on a tripod parapet using the locating pin and slot on the tripod parapet such that any other node will be placed in substantially the same orientation. Alternatively, the node can be attached to a bracket or other structure having a locating pin and slot. In step 1208, the GPS receivers are attached to the node using the keying fixtures as the alignment fixture. In step 1210, X, Y, and Z positional information is obtained. In step 1212, the GPS receivers are removed from the node.

In step 1214, the tiltmeter 602 is attached to the node using the keying fixtures as the alignment fixtures. In step 1216, the bearing of the node is obtained. In step 1218, the tiltmeter 602 is removed from the node. In step 1220, the offset data from the RAM, the position data and the bearing data are used to guide each turret 202 on the node to point to the desired other node. In step 1222, if the node becomes dysfunctional or needs to be replaces for some other reason, the node is removed and the replacement node is installed in its place using the locating pin and slot as keying fixtures. In step 1224, the offset data from the replacement node RAM is combined with the position data and bearing data previously obtained and used to guide each turret 202 on the replacement node to point to the desired other node.

Specific blocks, sections, devices, functions and modules have been set forth. However, a skilled technologist will realize that there are many ways to partition the system of the present invention, and that there are many parts, components, modules or functions that may be substituted for those listed above. While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A node for use in a wireless communication network, the node comprising:

a base mount configured to be removably attached to a position determination device and a tiltmeter for determining position of the node;

at least one azimuth plate;

an optical receiver/transmitter pair mounted on one of the at least one azimuth plate, wherein the at least one azimuth plate includes an azimuth stepper motor configured to adjust the azimuth pointing direction of the receiver/transmitter pair; and a post, wherein the at least one azimuth plate is rotatably mounted on the post and the post is configured to align the at least one azimuth plate with the base mount.

2. The node of claim 1, wherein the post includes a groove.

3. The node of claim 2, wherein the groove is a V-groove, wherein the V-groove is configured to receive a set screw that aligns the azimuth plate to the post.

4. The node of claim 1, wherein the post further comprises a conduit for transmitting signals to the transmitter/receiver pair.

5. The node of claim 1, wherein the base mount precisely aligns the position determination device and tiltmeter to the post.

6. The node of claim 1, further including a radome and a lid surrounding the optical receiver/transmitter pair.

7. The node of claim 1, further including a constant tension spring to reduce backlash in the stepper motor.

8. The node of claim 1 where the azimuth stepper motor is configured to provide at least 360 degrees of rotation to the transmitter/receiver pair.

9. The node of claim 1, wherein the at least one azimuth plate has an elevation stepper motor configured to adjust the elevation pointing direction of the receiver/transmitter pair.

10. The node of claim 9, further including a constant tension spring to reduce backlash in the elevation stepper motor.

11. The node of claim 9 where the azimuth stepper motor is configured to provide at least 20 degrees of elevation movement to the optical transmitter/receiver pair.

12. The node of claim 1, further comprising a non-volatile memory device to store data that accounts for offsets in the actual pointing direction of the optical receiver/transmitter pair relative to a design pointing direction.

13. A node for use in a wireless communication network, the node comprising:
a base mount configured to removably receive a position determination device and a tiltmeter;
a plurality of azimuth plates;
an optical receiver/transmitter pair mounted on one of the azimuth plates; and
a post, wherein the plurality of azimuth plates are rotatably mounted on the post and the post is configured to align the azimuth plates with the base mount.

14. A node for use in a wireless communication network, the node comprising:
a base mount configured to removably receive, a position determination device and a tiltmeter wherein the base mount comprises a first mounting box with a keyhole configured to receive a portion of the position determination device;
at least one azimuth plate;
an optical receiver/transmitter pair mounted on one of the at least one azimuth plate; and
a post, wherein the at least one azimuth plate is rotatably mounted on the post and the post is configured to align the at least one azimuth plate with the base mount.

15. The node of claim 14, further comprising a second mounting box, wherein the first mounting box has two slots proximate the keyhole to receive guide pins, and the second mounting box has one slot proximate the keyhole to receive a single guide pin.

16. A node for use in a wireless communication network, the node comprising:
a base mount configured to removably receive a position determination device and a tiltmeter;
at least one azimuth plate;
an optical receiver/transmitter pair mounted on one of the at least one azimuth plate;
a post wherein the at least one azimuth plate is rotatably mounted on the post and the post is configured to align the at least one azimuth plate with the base mount;
a radome and a lid surrounding the optical/transmitter pair; and
a tensioning screw and a spring configured to place the post in tension and the radome in compression.

17. A node for use in a wireless communication network, the node comprising:
a base mount configured to removably receive a position determination device and a tiltmeter, wherein the base mount includes an opening covered by a breathable patch;
at least one azimuth plate;
an optical receiver/transmitter pair mounted on one of the at least one azimuth plate;
a post wherein the at least one azimuth plate is rotatably mounted on the post and the post is configured to align the at least one azimuth plate with the base mount; and
a radome and a lid surrounding the optical/transmitter pair.

18. A node for use in a wireless communication network, the node comprising:
a base mount configured to removably receive a position determination device and a tiltmeter;
at least one azimuth plate;
an optical receiver/transmitter pair mounted on one of the at least one azimuth plate;
a post, wherein the at least one azimuth plate is rotatably mounted on the post and the post is configured to align the at least one azimuth plate with the base mount;
a radome and a lid surrounding the optical/transmitter pair; and
a heater element to prevent condensation on the radome.

19. A system for positioning and aligning a receiver/transmitter pair in a communication node, with said node part of a wireless communication network, the system comprising:
a position determination device configured to determine the position and bearing of the system for positioning;
a tiltmeter, configured to determine the pitch and roll orientation of the system for positioning within the network;
a base mount configured to be removably attached to the position determination device and the tiltmeter;
at least one azimuth plate;
an optical receiver/transmitter pair mounted on one of the at least one azimuth plate, wherein the at least one azimuth plate includes an azimuth stepper motor to adjust the azimuth pointing direction of the receiver/transmitter pair; and
a post, coupled to the base mount and wherein the at least one azimuth plate is rotatably mounted on the post and the post is configured to align the at least one azimuth plate with the base mount.

20. A system for positioning and aligning a receiver/transmitter pair in a communication node, with said node part of a wireless communication network, the system comprising:
a position determination device configured to determine the position and bearing of the system for positioning wherein the position determination device comprises two GPS receivers;
a tiltmeter, configured to determine the pitch and roll orientation of the system for positioning within the network;
a base mount configured to removably receive the position determination device and the tiltmeter;
at least one azimuth plate;
an optical receiver/transmitter pair mounted on one of the at least one azimuth plate; and a post, coupled to the base mount and wherein the at least one azimuth plate is rotatably mounted on the post and the post is configured to align the at least one azimuth plate with the base mount.

21. A system for positioning and aligning a receiver/transmitter pair in a communication node, with said node part of a wireless communication network, the system comprising:
   a position determination device configured to determine the position and bearing of the system for positioning wherein the position determination device is a differential GPS (DGPS) receiver;
   a tiltmeter, configured to determine the pitch and roll orientation of the system for positioning within the network;
   a base mount configured to removably receive the position determination device and the tiltmeter;
   at least one azimuth plate;
   an optical receiver/transmitter pair mounted on one of the at least one azimuth plate; and
   a post, coupled to the base mount and wherein the at least one azimuth plate is rotatably mounted on the post and the post is configured to align the at least one azimuth plate with the base mount.

22. The system of claim 21, wherein there are two DGPS receivers.

23. A system for positioning and aligning a receiver/transmitter pair in a communication node with said node part of a wireless communication network, the system comprising:
   a position determination device configured to determine the position and bearing of the system for positioning;
   a tiltmeter, configured to determine the pitch and roll orientation of the system for positioning within the network;
   a base mount configured such that the position determination device removably attaches to the base mount;
   at least one azimuth plate;
   an optical receiver/transmitter pair mounted on one of the at least one azimuth plate; and
   a post, coupled to the base mount and wherein the at least one azimuth plate is rotatably mounted on the post and the post is configured to align the at least one azimuth plate with the base mount.

24. A system for positioning and aligning a receiver/transmitter pair in a communication node, with said node part of a wireless communication network, the system comprising:
   a position determination device configured to determine the position and bearing of the system for positioning;
   a tiltmeter, configured to determine the pitch and roll orientation of the system for positioning within the network;
   a base mount configured such that the tiltmeter removably attaches to the base mount;
   at least one azimuth plate;
   an optical receiver/transmitter pair mounted on one of the at least one azimuth plate; and
   a post, coupled to the base mount and wherein the at least one azimuth plate is rotatably mounted on the post and the post is configured to align the at least one azimuth plate with the base mount.

25. A system for positioning and aligning a receiver/transmitter pair in a communication node, with said node part of a wireless communication network, the system comprising:
   a position determination device configured to determine the position and bearing of the system for positioning;
   a tiltmeter, configured to determine the pitch and roll orientation of the system for positioning within the network;
   a base mount comprising a first mounting plate and a second mounting plate, wherein the tiltmeter attaches to the first mounting plate;
   at least one azimuth plate;
   an optical receiver/transmitter pair mounted on one of the at least one azimuth plate; and
   a post, coupled to the base mount and wherein the at least one azimuth plate is rotatably mounted on the post and the post is configured to align the at least one azimuth plate with the base mount.

26. A method of pointing a directional transmitter/receiver pair of a communication node in a wireless communications network, wherein the node comprises a base mount configured to removably receive at least one position determining device and a tiltmeter, an azimuth plate, a directional receiver/transmitter pair mounted on the azimuth plate, and a post, wherein the azimuth plate is rotatably mounted on the post and the post is configured to align the azimuth plate with the base mount, said method comprising:
   determining tolerance offset data for the node;
   storing the offset data in a memory;
   installing the node on a fixture;
   determining the position and the bearing of the node using a position determination device installed on the node;
   determining the pitch and roll of the node; and
   pointing the optical transmitter receiver pair to a transceiver of another node using the offset data stored in the memory, the position, bearing, pitch and roll data.

27. The method of claim 26, wherein the tolerance offset data accounts for machining and assembly variations in the base mount, azimuth plate and post.

28. The method of claim 26, further including the step of removing the position determination device after the positional and bearing information is obtained.

29. The method of claim 26, wherein the act of determining the pitch and roll of the node is accomplished using a tiltmeter and wherein the method further comprises the step of removing the tiltmeter after the pitch and roll information is obtained.

30. A node for use in a wireless communication network, the node comprising:
   a base mount;
   a mounting arm connected to the base mount and configured to be removably attached to a position determining device, wherein the mounting arm is configured to be removably attached to a tiltmeter;
   at least one azimuth plate;
   an optical receiver/transmitter pair mounted on one of the at least one azimuth plate; and
   a post, wherein the at least one azimuth plate is rotatably mounted on the post and the post is configured to align the at least one azimuth plate with the base mount.

31. A node as defined in claim 30, wherein the mounting arm is removably connected to the base mount.

32. A node as defined in claim 30, wherein the mounting arm is configured such that a position determining device attached thereto is located a predetermined distance away from the node.

33. A node for use in a wireless communication network, the node comprising:
   a base mount configured to removably receive a position determination device;

a plurality of azimuth plates;

a plurality of optical receiver pairs, each of said receiver pairs positioned on a different one of the plurality of azimuth plates; and a post, wherein each of the plurality of azimuth plates is rotatably mounted on the post and the post is configured to align each of the plurality of azimuth plates with the base mount.

34. A node as defined in claim 33, wherein the base mount is configured to removably receive a tiltmeter.

35. A node as defined in claim 33, further comprising a mounting arm connected to the base mount and configured to removably receive a position determining device.

36. A node as defined in claim 35, wherein the mounting arm is removably connected to the base mount.

37. A node as defined in claim 35, wherein the mounting arm is configured such that a position determining device attached thereto is located a predetermined distance away from the node.

38. A node as defined in claim 35, wherein the mounting arm is configured to be removably attached to a tiltmeter.

39. A node for use in a wireless communication network, the node comprising:

a base mount configured to be removably attached to a position determination device and a tiltmeter for determining position of the node;

at least one azimuth plate;

an optical receiver/transmitter pair mounted on one of the at least one azimuth plate, wherein the at least one azimuth plate has an elevation stepper motor configured to adjust the elevation pointing direction of the receiver/transmitter pair; and a post, wherein the at least one azimuth plate is rotatably mounted on the post and the post is configured to align the at least one azimuth plate with the base mount.

40. A system for positioning and aligning a receiver/transmitter pair in a communication node, with said node part of a wireless communication network, the system comprising:

a position determination device configured to determine the position and bearing of the system for positioning;

a tiltmeter, configured to determine the pitch and roll orientation of the system for positioning within the network;

a base mount configured to be removably received attached to the position determination device and the tiltmeter;

at least one azimuth plate;

an optical receiver/transmitter pair mounted on one of the at least one azimuth plate, wherein the at least one azimuth plate has an elevation stepper motor configured to adjust the elevation pointing direction of the receiver/transmitter pair; and a post, coupled to the base mount and wherein the at least one azimuth plate is rotatably mounted on the post and the post is configured to align the at least one azimuth plate with the base mount.

* * * * *